UNITED STATES PATENT OFFICE.

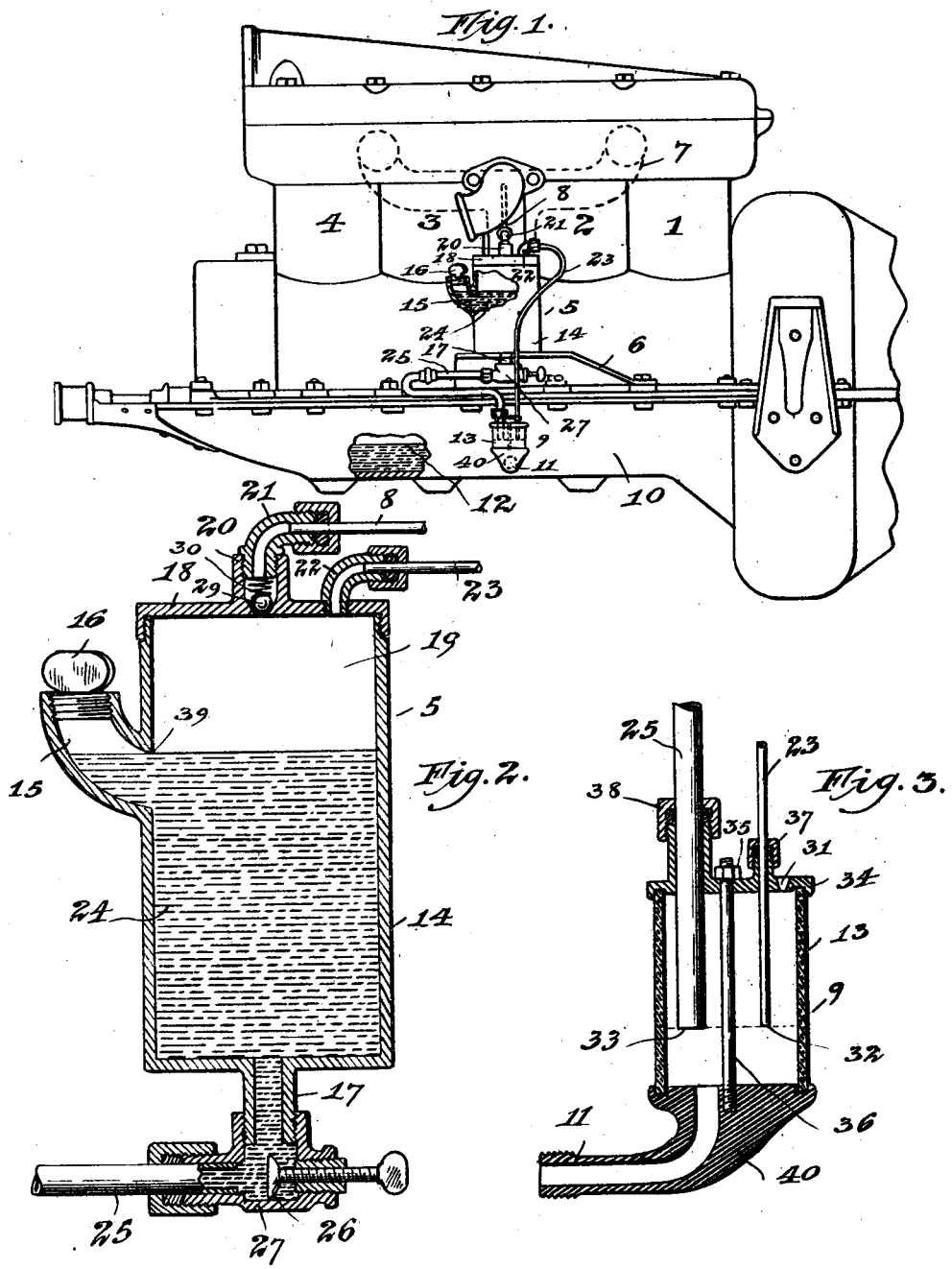

HUGH H. WILBURN, OF CONDON, OREGON, AND FREDERICK E. BUTLER, OF LEWISTOWN, IDAHO.

LUBRICATING SYSTEM FOR GAS-ENGINES.

1,194,453.   Specification of Letters Patent.   Patented Aug. 15, 1916.

Application filed May 7, 1914. Serial No. 836,948.

*To all whom it may concern:*

Be it known that we, HUGH H. WILBURN, a citizen of the United States, residing in the city of Condon, county of Gilliam, State of Oregon, and FREDERICK E. BUTLER, a citizen of the United States, residing in the city of Lewistown, county of Nez Perce, State of Idaho, have invented certain new and useful Improvements in Lubricating Systems for Gas-Engines, of which the following is a specification.

Our invention relates to lubricating systems and is more particularly adapted to those in which the lubricant is in the form of a fluid and is distributed by the splash system.

Among the salient objects of the invention are to provide a lubricating system wherein there is maintained a constant level in the chamber from which the lubricant is splashed; to provide a storage supply of lubricant at a level above that of the level of the lubricant in the splash chamber; to regulate the flow of the liquid from the storage chamber to the splash chamber and vice versa by the relative air pressures in said chambers; to provide a construction wherein the relative air pressures are varied by changing the pressure in the storage chamber independent of the pressure in the splash chamber whereby the latter may be, if desired, open to atmospheric pressure; to obtain the necessary suction in the storage chamber by connecting the air space directly to the intake of the engine; to regulate the admission of air to the storage chamber by the level of the lubricant in the splash chamber; to provide separate air and lubricant conduits between the storage chamber and splash chamber; to provide means for the convenient observation of the lubricant level in the splash chamber; to employ the same gage or stand glass through which the lubricant level is observed for observing the lower ends of the air and lubricant conduits leading to the splash chamber from the storage chamber; to permit use of a single member chamber; to form the storage chamber for the lubricant and the necessary air space above the lubricant and sealed by the level of the lubricant in the storage chamber from the filler cap space; to permit the convenient and economical application of the lubricant control mechanism to gas engines of standard construction; and in general to provide an improved lubricating system of the type mentioned, in which the operations will be controlled by the normal functions of the gas engine.

The invention further resides in the novel arrangement and combination of parts and various features of construction hereinafter set forth.

In the drawings Figure 1 is a side elevation, partly in section, of a multi-cylinder gas engine, to which our improved lubricating system is applied. Fig. 2 is an enlarged sectional view of the storage chamber showing the conduit connections therefor. Fig. 3 is an enlarged sectional view of the gage or stand glass.

In the drawings an embodiment of our invention is shown applied to a 4-cylinder engine, in which the cylinders 1 and 2 and 3 and 4 are cast in pairs respectively.

A lubricant storage chamber 5 is mounted upon the engine by any suitable means such as the bracket 6. As shown in Fig. 1 chamber 5 is mounted upon the left hand side of the engine and the air space in said chamber is connected to the intake manifold 7 by means of the pipe 8 leading through the space between the pairs of cylinders. For observation of the oil level we employ a gage or stand glass 9 which may be of any standard construction and is secured to the crank case 10 by means of a screw threaded nipple 11. This gage or stand glass 9 is preferably located sufficiently low on the crank case to bring the lubricant level 12 above the plane of the lower end of the glass portion 13 of the gage or stand glass 9. Inasmuch as the crank case and the gage or stand glass are in open communication their levels will correspond and the depth of the lubricant can be readily observed through the stand glass on the exterior of the crank case.

The storage chamber comprises the main body portion 14, the filler space 15, which is provided with suitable filler plug 16, the outlet nipple 17, and the cap 18, which closes the upper end of the tank and carries the air conduit fittings. The connection between the air space 19 of the storage chamber and the inlet manifold is made through the nipple 20, which is connected to the conduit 8 by suitable coupling member 21. The cap member 18 is provided with a second coupling member 22, which places the air space in open communication with the conduit 23 leading to the gage or stand glass 9. The lubricant space 24 of the storage tank 14 is similarly connected to the gage or stand glass by conduit 25 leading from the nipple 17.

In order to prevent the direct flow of the lubricant to the crank case when the storage tank is being filled and is in open communication with the atmosphere through the removal of the filler plug 16, a shut-off valve 26 is provided in the coupling member 27 which connects the nipple 17 with the conduit 25. Ingress of air into the air space 19 through the pipe 8 is prevented by the check valve 28 which is normally held to its seat by light coil spring 30. Therefore, after filling the tank 5 with lubricant the only path through which the air can enter the space 19 is through the vent 31 in the top of the gage or stand glass 9; thence through the opening 32 in the lower end of the conduit 23 and upward through said conduit and the nipple 22 into the air space 19. Conduit 25 through which the lubricant passes from the storage tank to the gage or stand glass is provided with an open end 33 preferably terminating in the same horizontal plane as the opening 32 in the conduit 23; the lower end of each of these conduits terminating in substantially the plane of the desired oil level in the crank case 10.

In assembling the parts the storage chamber 5 is secured to the engine casing through the medium of the bracket 6 and the conduits 8, 23 and 25 suitably connected thereto. The threaded nipple 11 of the elbow 40 of the gage or stand glass is screwed into an opening provided in the lower portion of the crank case, the glass 13 and cap 34 placed in position and secured in their mounted position by means of the nut 35 engaging the securing bolt 36. The lower portions of the pipes 23 and 25 extend through the cap 34 and when positioned at the proper level are held in place by means of stuffing boxes 37 and 38.

When properly assembled the lubricating system operates in the following manner: The filler plug 16 is removed and oil permitted to flow into the storage chamber 14 and through the pipe 25, stand glass 9 and nipple 11 into the crank case, and the operator can readily observe through the glass 13 when the level of lubricant desired in the crank case is reached. Upon observing the lubricant at the desired level, the shut-off valve 26 is adjusted to close the connection between the nipple 27 and the pipe 25, thereby preventing further flow of lubricant to the crank case. The storage tank is then filled to bring the level of the lubricant therein above the edge 39, thereby shutting off the air in the space 19 from that in the filler space 15. Upon completion of the filling operation the plug 16 is replaced and the valve 26 opened. However, the lubricant will not continue to flow into the crank case since the lower ends 32 and 33 of the conduits 23 and 25 are closed from any atmospheric communication by the lubricant. During the operation of the engine a certain portion of the lubricant in the crank case is splashed to the various working parts of the motor, thus reducing the level in the bottom of the crank case and when this level recedes to a point below the openings 32 and 33 the conduits 23 and 25 will be open to the air which passing through the conduit 23 will replace some of the lubricant in the chamber 14 permitting the discharge of lubricant through conduit 25 into the stand glass 9 and thence into the crank case 10.

When sufficient lubricant has passed from the tank 14 to the crank case to bring the level of the latter and the stand glass above the plane of the open ends of the conduits 23 and 25 the air space 19 of the storage chamber will again be shut off from communication with the atmosphere and further discharge of lubricant into the crank case prevented.

In the operation of the engine a portion of the lubricant removed by the splash pockets will have returned to the crank case, and this together with the additional lubricant which has been supplied from the storage chamber will tend to raise the level of the lubricant higher than that proper for efficient and economical use. In order to avoid the excessive rise of the lubricant in the crank case, provision is made for drawing back into the chamber a portion of the lubricant in the crank case. This is preferably accomplished by connecting the air space 19 of the storage chamber with the intake manifold of the engine, so that upon the suction stroke lubricant will be drawn upward from the crank case 10 and the stand glass 9 through the conduit 25 into the oil space 24 of the storage chamber. The lowering of the lubricant level in the crank case 10 and stand glass 9 will continue in this manner until the level reaches the lower ends of the conduits 23 and 25, and any lowering beyond this point by the suction of the engine will be prevented by the unsealing of the opening 32 in the air pipe 23 after which air will flow up into the air space 19 in the storage chamber and displace the lubricant which will flow back into the crank case. It is obvious that in this manner the level of the lubricant in the crank case and the stand glass is maintained practically constant, and that the operator can at any time observe whether the level is at the desired point and if the lubricating system is operating properly.

In certain types of engines wherein the casing around the fly wheel is the lowest part and the lubricant is picked up by the fly wheel and distributed to the motor, it is considered desirable that the lubricant be supplied to the fly wheel casing from the reservoir only when the motor is not running. It is obvious that by proportioning the inlet and outlet conduits to the reservoir that sufficient vacuum may be maintained in the reservoir to prevent any substantial flow from the reservoir to the fly wheel casing while the engine is running.

It is obvious that various changes in construction and combination of parts can be made, and we therefore do not desire to limit this invention except as specified in the appended claims.

We claim—

1. In a lubricating system, the combination of lubricant chambers, one of said chambers having its lubricant level above the plane of the lubricant level in the other chamber, means for reducing the pressure in the upper chamber to less than atmospheric pressure, a lubricant conduit connecting said chambers, and an air conduit also connecting said chambers, the said air conduit opening into the upper portion of the first mentioned chamber, and having its lower end opening in substantially the plane of the lubricant level in the lower chamber.

2. In a lubricating system, the combination of lubricant chambers having different lubricant levels, a stand glass in open communication with the chamber having the lower lubricant level, lubricant and air conduits opening into the chamber having the higher lubricant level, means for reducing the pressure in the last mentioned chamber to less than atmospheric pressure, said conduits having their lower ends terminate within the stand glass at substantially the plane of the desired lubricant level for the chamber having the lower level.

3. In a lubricating system, the combination of lubricant chambers arranged at different levels, a conduit leading from the chamber having the higher level to a suction producing means, an air conduit in open communication with the space above the lubricant in the chamber having the higher level, said air conduit having its lower end terminating in the plane of the desired lubricant level for the lower chamber, and a lubricant conduit connecting the two chambers.

HUGH H. WILBURN.
FREDERICK E. BUTLER.

Witnesses to signature of Hugh H. Wilburn:
JOHN P. HESS,
O. B. ROBERTSON.

Witnesses to signature of Frederick E. Butler:
EWING W. STEPHENS,
A. M. McCLURE.